April 5, 1966  E. A. BENDER  3,244,404
DRAWWORKS ASSEMBLY
Filed Oct. 22, 1962  5 Sheets-Sheet 1
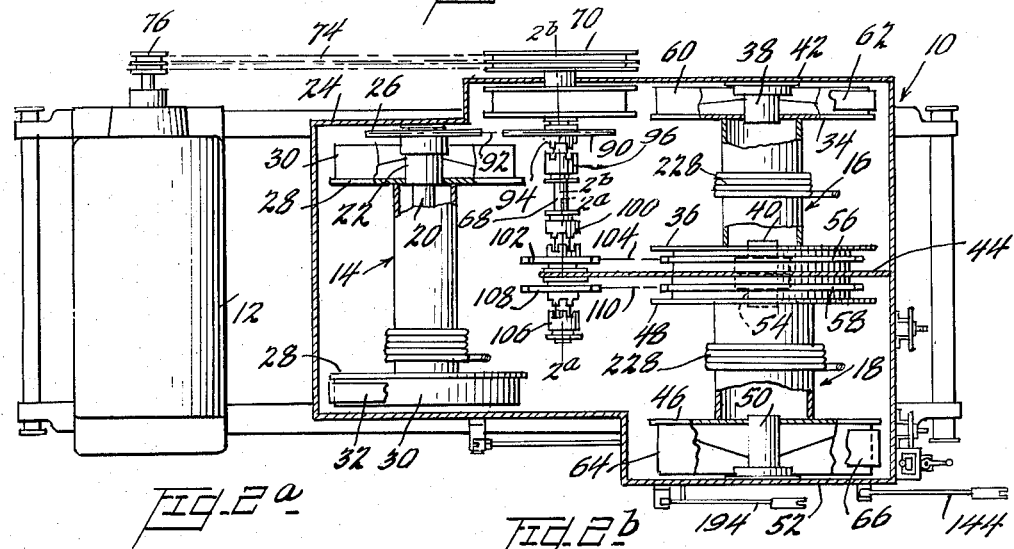
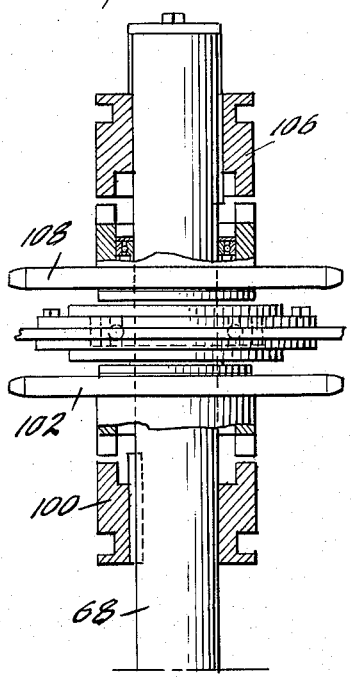
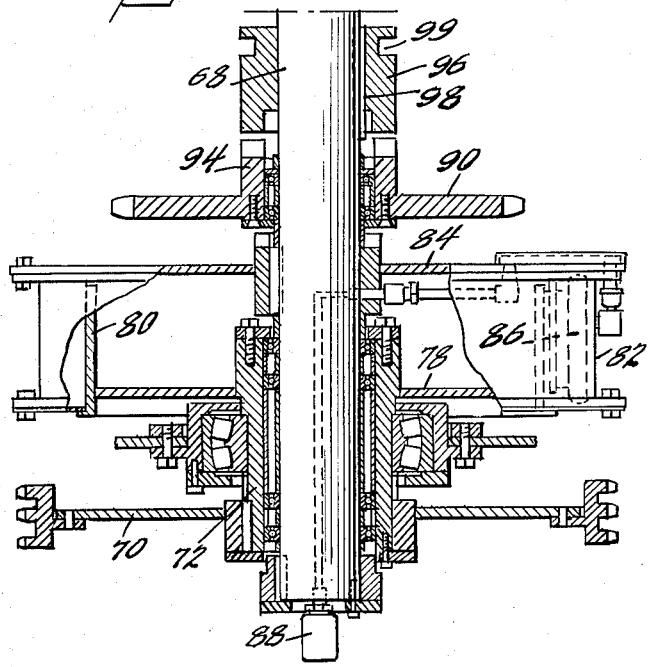
INVENTOR
Emil A. Bender,
BY Parker and Walsh
ATTORNEYS

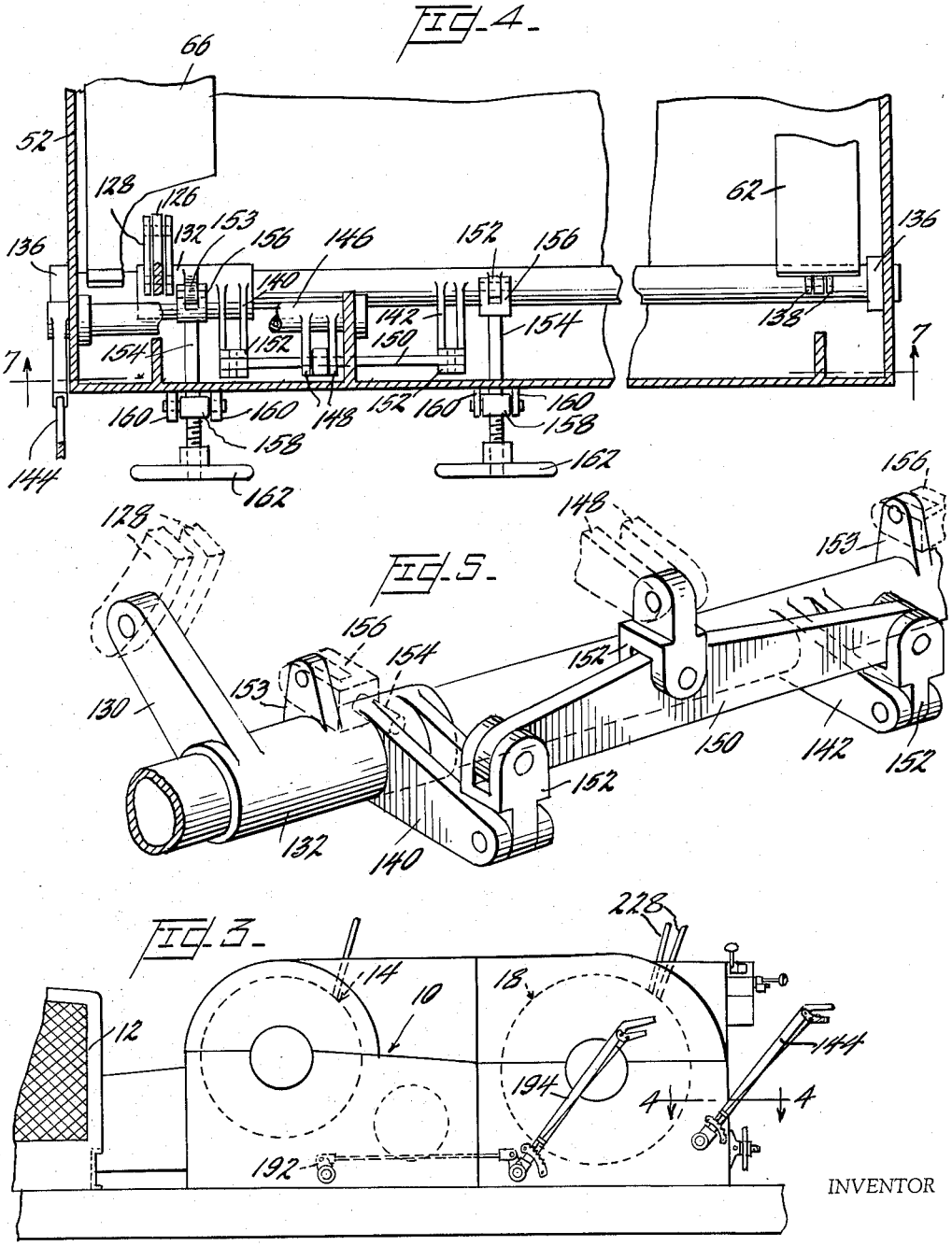

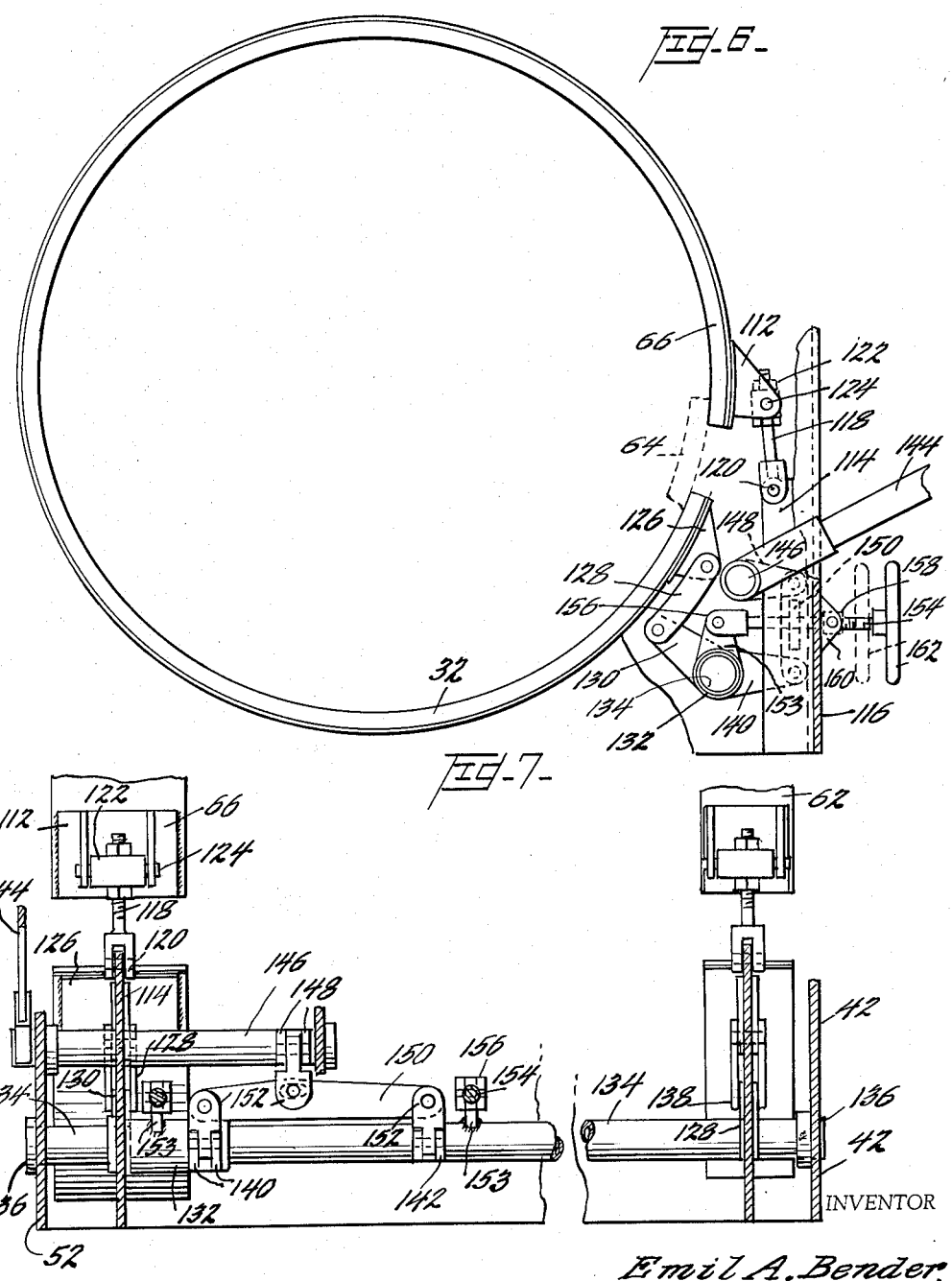

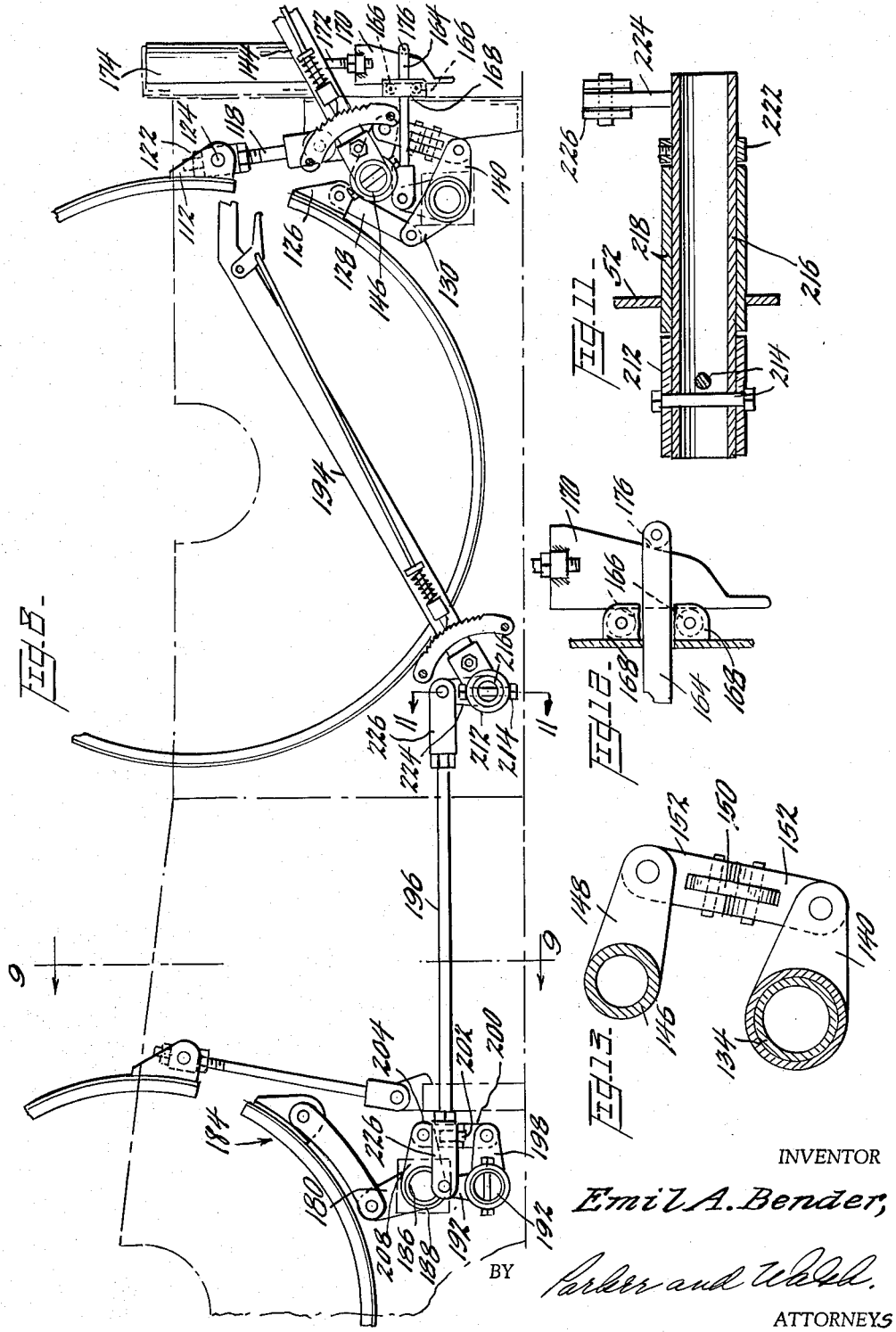

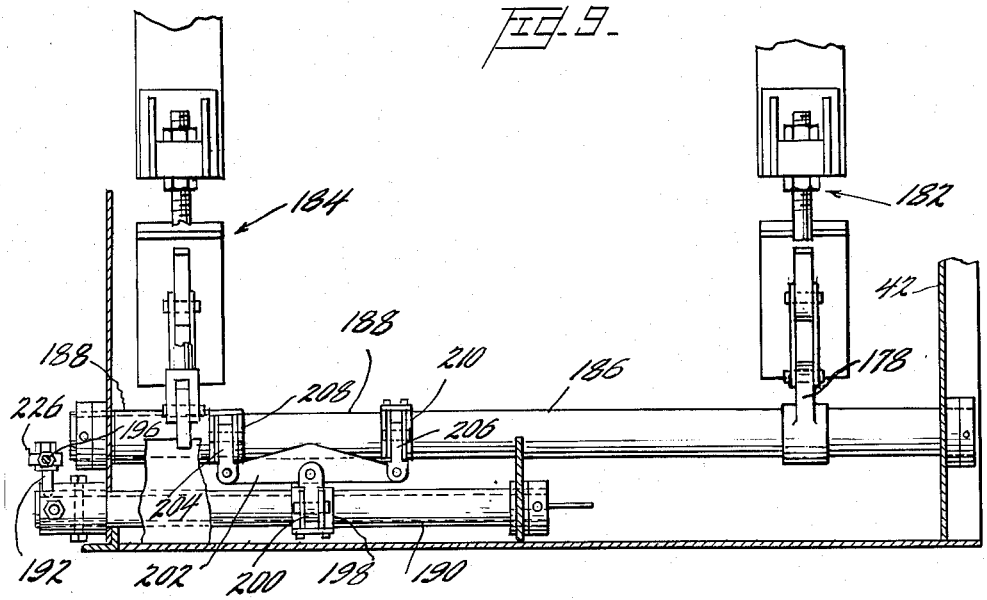
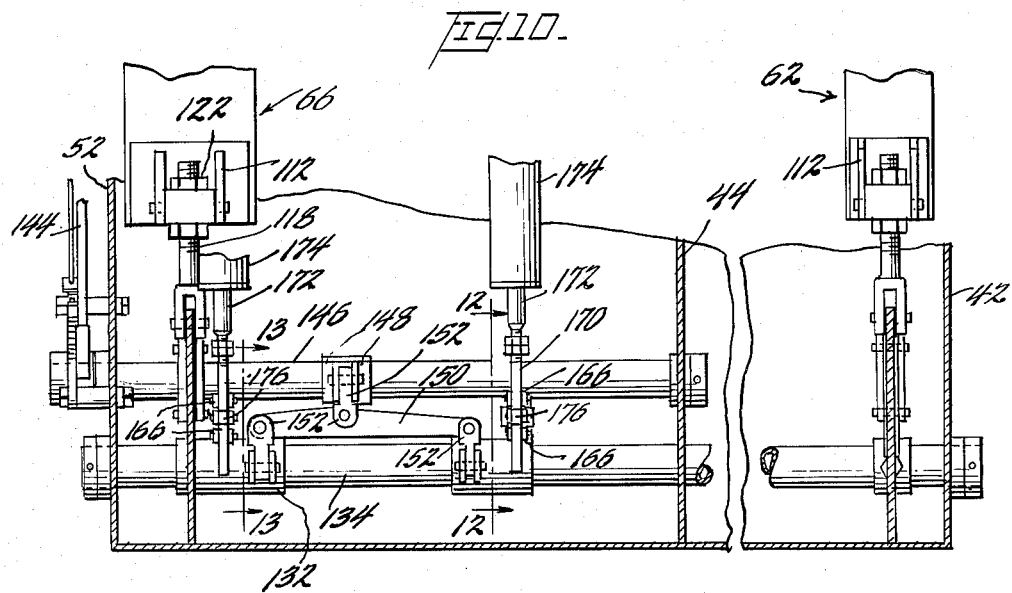

United States Patent Office 3,244,404
Patented Apr. 5, 1966

3,244,404
DRAWWORKS ASSEMBLY
Emil A. Bender, P.O. Box 52, Bakersfield, Calif.
Filed Oct. 22, 1962, Ser. No. 232,187
24 Claims. (Cl. 254—185)

This invention relates to a drawworks assembly, and is concerned with an improvement over the device of a similar character disclosed in my co-pending application, Serial No. 180,577, filed March 19, 1962, and now abandoned. In said application I have disclosed a cable-winding unit which, among other stated advantages, presents a solution to the problem of line wear in cables as in well-drilling operations, by providing a system of infinitely variable take-up by selective division of take-up between a companion set of two windup drums, with controls for operating the drums in unison, or singly, and the drums having different diameters.

In the modification shown in the said, prior application, the selective winding was accomplished by means of a separate brake provided on each of the respective drums, each with its own controls and the brake control mechanism was shown in simplified form, with conventional structure, and it is a general object of the present invention to provide an improved system for selective operation of this dual drum type of drawworks assembly. Another comprehensive object it to facilitate manual operation of the drum control system.

More particularly, it is an object to provide a system for separate or conjoint operation of the drum units, which provides a brake-equilization feature in the conjoint operation.

In still greater particular it is an object to provide a brake system with an input element in the form of a dual rocker arm, or walking beam, and means to selectively swing either end of the rocker, and lock it against movement. An object related to the foregoing is to provide brake control through two separate, co-axial shafts, separately or jointly operable from a single input means.

A further object is to provide a continuously operative countershaft having a system of clutches arranged in cooperative relation to the selective system of operation of the drums.

These and other objects, which will be apparent are attained by the present invention, preferred forms of which are described in the following specification, as illustrated in the drawings, in which:

FIGURE 1 is a top plan view of a winding drum unit according to the invention,

FIGURES 2a and 2b are axial, sectional views through the countershaft of the system shown in FIGURE 1, taken on the plane of the lines 2a—2a and 2b—2b of FIGURE 1, respectively, FIGURE 3 is a side elevational view of the system shown in FIGURE 1, as seen from below that figure, slightly enlarged in scale, and foreshortened by breaking away one end, FIGURE 4 is a fragmental, sectional view taken on the plane of the line 4—4 of FIGURE 3, and enlarged in scale over that figure, FIGURE 5 is a fragmental, perspective view of the torque tubes and equalizer rocker, on enlarged scale, FIGURE 6 is an end elevational view of the fragment shown in FIGURE 4, as seen from the left of that figure, FIGURE 7 is a sectional view taken on the plane of the line 7—7 of FIGURE 4, FIGURE 8 is a side elevational view, similar to FIGURE 3, showing a modified locking means for the brake linkage, FIGURE 9 is a sectional view taken on the plane of the line 9—9 of FIGURE 8, showing the brake system on the sandreel, FIGURE 10 is an end elevational view of the system shown in FIGURE 8, as seen from the right of that figure broken away in part, and foreshortened, and showing the brake system on the dual drums, FIGURE 11 is a sectional view of a detail of one of the hand brake levers, taken on the line 11—11 of FIGURE 8, FIGURE 12 is a sectional view of a detail of the brake-lock wedge, taken on the line 12—12 of FIGURE 10, and FIGURE 13 is a sectional view taken on the line 13—13 of FIGURE 10, and showing details of the lever arms in one of the brake control systems.

Referring to the drawings by characters of reference, the modification shown in FIGURES 1–7, involving a hand-operated brake-locking mechanism, will first be described. Thus, there is shown, in FIGURE 1, a mounting framework, indicated as a whole by the numeral 10, mounting the drawworks assembly, which includes a driving engine 12, a sandreel 14, and a pair of coacting, axially aligned, cable winding drums 16, 18, the latter of slightly greater diameter than the former, for purposes stated in the above-said prior application, and to be repeated hereinafter. The axes of all of the rotating parts 12, 14, 16 and 18 are mutually parallel, and those of 16 and 18 are aligned.

Sandreel 14 has a central core 20, in which are fixed a pair of end stub shafts, or trunnions 22, journalled in suitable bearings in side walls 24 of frame 10, and one of which has keyed thereto a driven sprocket 26. The sandreel also has end flanges 28, with brake drums 30 and banded brake shoes 32.

Drums 16 and 18 are also trunnion mounted, for independent rotation, drum 16 having end flanges 34, 36, to which are secured the trunnions 38, 40, respectively, the former being carried in bearings in a side wall 42 of the framework, and the latter being carried in bearings in a partition wall 44 located medially of the width of the framework. Similarly, drum 18 has flanges 46, 48 with an outer trunnion 50 journalled in bearings in a side wall 52 of the framework, and an inner trunnion 54 journalled in bearings carried by partition 44. The respective, inner flanges 36, 48 of the co-axial drums carry driven sprockets 56, 58. As in the case of reel 14, outer flange 34 of drum 16 carries a brake drum 60, with a banded brake shoe 62, and outer flange 46 of drum 18 carries a brake drum 64, with banded brake shoe 66.

Before proceeding to a description of the brake-control mechanism, the transmission conuntershaft will be next described. This is shown in enlarged detail, in FIGURES 2a and 2b, and may be characterized, in general as comprising a solid shaft, journalled in suitable bearings in a side wall and the partition of framework 10, a main clutch controlling the shaft, and a series of three auxiliary clutches, one controlling the sandreel 14, and the other two controlling the respective drums 16 and 18. The countershaft system is carried on a solid shaft 68, journalled in the side wall 42, and partition 44 of framework 10, and the power input is through a sprocket 70, keyed to a sleeve 72, rotatably journalled on the shaft 68, the sprocket being actuated by a chain 74 connecting with the output sprocket 76 of engine 12. The rotating sleeve 72 carries a flange, or disc 78, with drum 80, the latter being the inner member of a friction clutch, the outer member 82 of which is connected to shaft 68 through a flange, or disc, 84, and is carried in rotation by drum 80, by frictional contact therewith through a toroidal, pneumatic bag 86, to which air is conducted from an end coupling 88 on the shaft, and suitable passages in the clutch parts. Since the clutch, per se, is conventional as to structure, it need not be described in further detail. For purposes of the present invention, it is sufficient to state that this clutch initiates or terminates all power transmission to the three drums.

The transmission of power to the respective winding drums is controlled through three, sliding jaw clutches of the crown-coupling type, and as shown, these are of identical structure. Operation of the sandreel 14 is effected through a sprocket 90, connected to sprocket 26 of the sandreel through a chain 92, the sprocket 90 being freely rotatable on shaft 68, through anti-friction bearings, and having a toothed sleeve 94, engageable by a similarly toothed sleeve 96, slidable along a key 98, by means of which it is carried in rotation by shaft 68. The sleeve 96 is shown as having an annular groove 99 for engagement by a suitable actuating, forked lever (not shown), and it will be understood that the lever may be actuated either by hand or by suitable power means, such as an air cylinder, or other servo mechanism.

Similarly a toothed sleeve 100 is designed to communicate rotation to a sprocket 102, which actuates sprocket 56 of drum 16, through a chain 104, and a toothed sleeve 106 engages a sprocket 108, which actuates sprocket 58 of drum 18, through a chain 110.

Thus, the main drive chain 74 may operate continuously, and the drive to any one or all of the three drums, or any combination thereof, as determined by the setting of the jaw clutches, may be initiated or stopped by operation of the main clutch. Furthermore, any one or all or any combination of the three may be controlled by suitable operation of the jaw clutches, during rotation of the countershaft 68.

The clutching mechanisms just described constitute one aspect, or functional component of the infinitely variable drum-winding system which contrives to shift the pattern of line storage at will, thus minimizing, if not almost eliminating line wear in the cable. Another important aspect resides in the system of brake control for the drums, which will now be described.

Referring to FIGURES 3–7, the brake shoe control linkage will be clear from FIGURE 6, being the same for the shoes on the two drums 16, 18. Thus, the upper, brake shoe terminus, at the split, carries a bracket 112, which is adjustably anchored to an upright plate 114, secured to a transverse wall 116 of the framework, by an eye bolt 118, swivelled on a pin 120 carried by plate 114, and threaded in a nut 122, which is swivelled in bracket 112 by a pin 124. The adjacent, other free end of the shoe also carries a bracket 126, pivotally carrying a double, arcuate link 128, the other ends of which are pivoted to a radially extending lever arm 130 on a sleeve 132, rotatably carried on a tubular shaft 134, the ends of which are journalled in the side walls 42, 52, of the framework, as secured by collars 136. At the other drum, 16, the equivalent 138, of lever 130, is carried by shaft 134. Thus, rotation of sleeve 132, on shaft 134, actuates the brake shoe on drum 18, and rotation of shaft 134 actuates the brake shoe on drum 16.

Sleeve 132 has a second lever 140 (FIGS. 5 and 6), with dual arms, through which rotation is imparted to sleeve 132, and which, with lever 130, constitutes a bell crank; and similarly, a dual-arm lever 142 imparts rotation to shaft 134. A single input to both levers 140, 142, and hence to the brake shoes on the two drums, is communicated by a manual brake lever 144, keyed to a shaft 146, journalled in the framework, and carrying a dual lever arm 148, which communicates swing to arms 140 and 142 through a rocker arm 150, which is pivotally attached at its ends to levers 140, 142 by T-form couplers 152, with pivot pins on mutually perpendicular axes, and at a point medially of its length to lever 148 by a similar, T coupling.

To the extent that the brake control has thus far been described, it will be clear that both brake shoes may be actuated by a movement of the hand lever 144, and that the input force will divide between the levers 140 and 142. In this action, each of the ends of the rocker arm 150 is capable of moving independently of the other, and this provides an equalizing function, which guarantees full braking power to each shoe, regardless of maladjustment of the brake shoes, such as due to unequal wear or other causes.

In addition to the merits of the divided input mechanism as an equalizer, the present invention also contemplates further utilization of the system in an arrangement for selectively preventing rotation of one of the drums while permitting it in the other. Viewed generally, this is accomplished by depressing one only of the levers 140 or 142, to fully braking position, and locking it in this position. Since there is no effect on the other brake shoe, the other drum will continue to rotate until it is braked, either by the hand lever, or by its own auxiliary braking device.

The auxiliary braking system is best seen by reference to FIGURES 4 and 6, as further clarified in FIGURES 5 and 7. One of the auxiliary systems is arranged to rotate sleeve 132, and the other to rotate shaft 134, and for this purpose each has a lever arm 153 extending from its upper side. The lever arms 153 are actuated in a sense to apply pressure on the brake shoes, by means of pull rods 154, with forked ends, or clevises 156, pivoted to levers 153, and their outer ends threadedly received in a nut 158 (FIG. 4) swivelly mounted in brackets 160, carried by the framework, and keyed to operating, handwheels 162. By this device, either brake may be applied, for a fixed hold, before or during operation of the co-axial drum system.

It will be understood, of course, that the arrangement of the drums co-axially is a preferred form, from the standpoint of convenience of design, operation and maintenance, and other reasons, but that this exact arrangement is not essential in the practice of the invention, since the drums may be located in tandem, on parallel axes, or in several other ways, without sacrifice to the concept of selective operation for varying the pattern of cable storage on the respective drums.

The device shown in FIGURES 8–13 differs essentially from that of FIGURES 1–7 in the means for actuating the auxiliary brake-actuating and locking mechanism. In this form, in place of the screw-threaded pull rod and hand wheel, there is substituted cam follower pull rods, and actuating cam wedges, urged by air cylinders. Each pull rod 164 is trained between a pair of rollers 166, journalled in brackets 168 on the framework, and the wedges 170, suspended from the piston rods 172 of air cylinders 174, are adapted to move between the rollers 166 and a follower roller 176 carried on the forked, outer end of pull rod 164. All other parts of the brake-actuating mechanism are substantially the same as in the modification described hereinabove, and therefore, the main elements have been designated by the same reference characters as used in the other modification.

The brake controls at the sandreel, shown in FIGURE 9, and which may be considered as applying in both modifications shown, differ from the controls for the dual drums in the absence of auxiliary brake actuating units, these being unnecessary, since both brake shoes are on a single drum. However, this system does include the equalization feature, and shows a modification thereof in that braking forces are applied through the rocker arm through a pull, rather than a push.

As seen in FIGURES 8 and 9, the operating levers 178, 180 for the brake shoes 182, 184, are carried, respectively, on a cross shaft 186 and a sleeve 188, nested on the shaft, as in the case of the dual drums. A shaft 190, journalled in the framework, and located below shaft 186, with an end lever 192, linked to a hand lever 194 through a pull rod 196, carries a forked lever 198, pivotally attached to a link 200, which in turn is pivoted at a medial position on a rocker arm 202, the ends of which are connected through pivoted links 204, 206, respectively, to a lever arm 208, carried by sleeve 188, and a lever arm 210, carried by shaft 186.

The mounting of hand lever 194 is shown in FIGURE 11, wherein a hub or sleeve 212, carrying the lever 194, is secured by bolts 214, to a tube 216, mounted for rotation in a sleeve 218, secured in an opening in framework wall 52, the tube being secured, inside the framework, by a collar 222, and carrying a radial lever 224, to which is pivoted the clevis 226 (FIG. 8), carried on the end of pull rod 196. It will be noted that the hand levers 144 and 194 are located close together, for convenience of the operator.

As set forth in the aforesaid prior application, the two ends of a single cable, such as 228 (FIGURES 1 and 3) are secured, respectively to the two drums 16 and 18, and the resulting loop in the line carries a load-bearing sheave unit. Power is applied for lifting, but the loads may descend under their own weight. According to the basic principles of the novel system, the sheave is cause to change its position in the line, by varying the relative rate of windup of the two sections of the line at the drums. By the use of two drums of different diameter, this shifting will take place continuously, during winding and unwinding, to a degree dependent upon the ratio of the two drum diameters. In addition, the rate of shift of the load point along the cable may be speeded up, at will, by partially or fully braking one of the drums. Thus, compensation, to defeat cable wear may be effected at any time, in any degree, and to suit any of several load conditions encountered. By the same device, the speed and load-carrying capacity of the system may be varied, concurrently with wear compensation.

By means of the branched input of the braking force shown and described herein, efficiency, and facility of operation are greatly improved, in the reduction of the number of braking controls, from two to one. In addition, automatic compensation for misadjustment of the brakes is achieved, and the inactivation of one or the other of the coacting drums for protracted periods, is not only facilitated, but rendered more reliable and secure, and the need for attention or surveillance correspondingly minimized.

While certain preferred embodiments have been shown and described, other modifications, in addition to those mentioned herein, will become apparent, in the light of this disclosure, and the invention should not, therefore, be deemed as limited, except insofar as shall appear from the spirit and scope of the appended claims.

I claim:

1. A drawworks assembly comprising a mounting framework, a countershaft journalled in said framework, means to communicate rotation to said countershaft, a clutch mechanism between said means and said countershaft, a pair of drums of different diameters mounted in said framework for rotation on a common axis parallel to the axis of said countershaft, and in spaced relation thereto, a separate means for communicating rotation from said countershaft to each of said drums, a clutch means on said countershaft for each of said separate means, a brake on each of said drums, and a main actuating means for said brakes, comprising an inner shaft and an outer sleeve rotatable thereon, a bell crank on said inner shaft with an output lever linked to one of said brakes, and a bell crank on said sleeve, with an output lever linked to the other of said brakes, a brake control lever having a swing shaft journalled in said framework, and said swing shaft having a radially disposed, output lever, a rocker arm with its ends linked to the input levers of said bell cranks, and a link connecting said output lever on said swing shaft to said rocker arm, at a position between the linked ends thereof, and means to apply braking effort by rotation of said inner shaft or said outer sleeve, independently of said brake control lever.

2. A device as in claim 1, the last-mentioned means comprising radial, lever arms on said inner shaft and said outer sleeve, a push-pull rod pivotally connected to each said radial, lever arm, and arranged for rotation, and each said pull rod having a threaded connection with a part of said framework, and having a hand wheel.

3. A device as in claim 1, the last-mentioned means comprising radial, lever arms on said inner shaft and said outer sleeve, and means on said framework, adapted to swing said radial lever arms, independently.

4. A device as in claim 3, said means for swinging said radial lever arms comprising push-pull rods having follower means, cam means arranged to actuate said follower means, and power means to actuate said cam means.

5. In a device as in claim 1, a third drum arranged on an axis parallel to said countershaft, drive means, including a clutch, between said countershaft and said third drum, a pair of brake shoes carried at the ends of said drum, and a control for said pair of brake shoes substantially similar to the said main, actuating means for the brake shoes on said pair of drums.

6. In a device as in claim 1, a cable with its two ends anchored on the respective, said drums, and wound thereon in the same direction.

7. A drawworks assembly comprising a mounting framework, a countershaft journalled in said framework, a pair of drums of different diameters mounted in said framework for rotation on a common axis, parallel to the axis of said countershaft, and in spaced relation thereto, a separate means for communicating rotation from said countershaft to each of said drums, a clutch means on said countershaft for each of said separate means, a brake on each of said drums, and a main actuating means for said brakes, comprising an inner shaft and an outer sleeve rotatable thereon, a bell crank on said inner shaft with an output lever linked to one of said brakes, and a bell crank on said sleeve, with an output lever linked to the other of said brakes, a brake control lever having a swing shaft journalled in said framework, and said swing shaft having a radially disposed, output lever, a rocker arm with its ends linked to the input levers of said bell cranks, and a link connecting said output lever on said swing shaft to said rocker arm, at a position between the linked ends thereof, and means to apply braking effort by rotation of said inner shaft or said outer sleeve, independently of said brake control lever.

8. A drawworks assembly comprising a mounting framework, a countershaft journalled in said framework, a pair of drums of different diameters mounted in said framework for rotation on a common axis, a separate means for communicating rotation from said countershaft to each of said drums, a clutch means on said countershaft for each of said separate means, a brake on each of said drums, and a main actuating means for said brakes, comprising an inner shaft and an outer sleeve rotatable thereon, a bell crank on said inner shaft with an output lever linked to one of said brakes, and a bell crank on said sleeve, with an output lever linked to the other of said brakes, a brake control lever having a swing shaft journalled in said framework, and said swing shaft having a radially disposed, output lever, a rocker arm with its ends linked to the input levers of said bell cranks, and a link connecting said output lever on said swing shaft to said rocker arm, at a position between the linked ends thereof, and means to apply braking effort by rotation of said inner shaft or said outer sleeve, independently of said brake control lever.

9. A drawworks assembly comprising a mounting framework, a countershaft journalled in said framework, a pair of drums of different diameters, mounted in said framework for rotation on a common axis, a separate means for communicating rotation from said countershaft to each of said drums, a clutch means on said countershaft for each of said separate means, a brake on each of said drums, and a main actuating means for said brakes, comprising an inner shaft and an outer sleeve rotatable thereon, a bell crank on said inner shaft with an output lever linked to one of said brakes, and a bell crank on said sleeve, with an output lever linked to the other of said brakes, a brake control lever, a rocker arm with its ends linked to the input levers of said bell cranks, and a link connecting said control lever to said rocker arm, at a position between the linked ends thereof, and means to apply braking effort by rotation of said inner shaft or said outer sleeve, independently of said brake control lever.

10. A drawworks assembly comprising a mounting framework, a countershaft journalled in said framework, a pair of drums of different diameters, mounted in said framework for rotation on a common axis, a separate means for communicating rotation from said countershaft to each of said drums, a brake on each of said drums, and a main actuating means for said brakes, comprising an inner shaft and an outer sleeve rotatable thereon, a bell crank on said inner shaft with an output lever linked to one of said brakes, and a bell crank on said sleeve, with an output lever linked to the other of said brakes, a brake control lever, a rocker arm with its ends linked to the input levers of said bell cranks, and a link connecting said control lever to said rocker arm, at a position between the linked ends thereof, and means to apply braking effort by rotation of said inner shaft or said outer sleeve, independently of said brake control lever.

11. A drawworks assembly comprising a mounting framework, a pair of drums of different diameters, mounted in said framework for rotation on a common axis, a separate means for communicating rotation to each of said drums, a brake on each of said drums, and a main actuating means for said brakes, comprising an inner shaft and an outer sleeve rotatable thereon, a bell crank on said inner shaft with an output lever linked to one of said brakes, and a bell crank on said sleeve, with an output lever linked to the other of said brakes, a brake control lever, a rocker arm with its ends linked to the input levers of said bell cranks, and a link connecting said control lever to said rocker arm, at a position between the linked ends thereof, and means to apply braking effort by rotation of said inner shaft or said outer sleeve, independently of said brake control lever.

12. A drawworks assembly comprising a mounting framework, a pair of drums mounted in said framework for rotation on a common axis, a separate means for communicating rotation to each of said drums, a brake on each of said drums, and a main actuating means for said brakes, comprising an inner shaft and an outer sleeve rotatable thereon, a bell crank on said inner shaft with an output lever linked to one of said brakes, and a bell crank on said sleeve, with an output lever linked to the other of said brakes, a brake control lever, a rocker arm with its ends linked to the input levers of said bell cranks, and a link connecting said control lever to said rocker arm, at a position between the linked ends thereof, and means to apply braking effort by rotation of said inner shaft or said outer sleeve, independently of said brake control lever.

13. A drawworks assembly comprising a mounting framework, a pair of drums mounted on said framework for rotation on parallel axis, a separate means for communicating rotation to each of said drums, a brake on each of said drums, and a main actuating means for said brakes, comprising an inner shaft and outer sleeve rotatable thereon, a bell crank on said inner shaft with an output lever linked to one of said brakes, and a bell crank on said sleeve, with an output lever linked to the other of said brakes, a brake control lever, a rocker arm with its ends linked to the input levers of said bell cranks, and a link connecting said control lever to said rocker arm, at a position between the linked ends thereof, and means to apply braking effort by rotation of said inner shaft or said outer sleeve, independently of said brake control lever.

14. A drawworks assembly comprising a mounting framework, a pair of drums mounted in said framework for rotation, a separate means for communicating rotation to each of said drums, a brake on each of said drums, and a main actuating means for said brakes, comprising an inner shaft and an outer sleeve rotatable thereon, a bell crank on said inner shaft with an output lever linked to one of said brakes, and a bell crank on said sleeve, with an output lever linked to the other of said brakes, a brake control lever, a rocker arm with its ends linked to the input levers of said bell cranks, and a link connecting said control lever to said rocker arm, at a position between the linked ends thereof, and means to apply braking effort by rotation of said inner shaft or said outer sleeve, independently of said brake control lever.

15. A drawworks assembly comprising a mounting framework, a pair of co-axial drums, of different diameter mounted for rotation in said framework, a separate drive means for each of said drums, a brake on each drum, an operating lever connected to each brake, a link pivotally connecting said operating levers, means to impart a braking force to said link medially of said levers, and separate means for imparting swinging movement to said levers, including lock means to hold said levers in adjusted position of swing.

16. A device as in claim 15, said separate means comprising push-pull rods, and means to actuate said push-pull rods.

17. A device as in claim 15, said separate means comprising push-pull rods, threadedly carried by the framework, and having hand-wheels.

18. A device as in claim 15, said separate means comprising push-pull rods having follower means, cam means to actuate said follower means, and power means to actuate said cam means.

19. A drawworks assembly comprising a mounting framework, a pair of co-axial drums, of different diameter mounted for rotation in said frame work, a separate drive means for each of said drums, a brake on each drum, an operating lever connected to each brake, a link pivotally connecting said operating levers, and means to impart a braking force to said link medially of said levers.

20. A drawworks assembly comprising a mounting framework, a pair of drums, of different diameter, mounted for rotation in said framework, a separate drive means for each of said drums, a brake on each drum, an operating lever connected to each brake, a link pivotally connecting said operating levers, and means to impart a braking force to said link medially of said levers.

21. A drawworks assembly comprising a mounting framework, a pair of drums mounted for rotation in said framework, a separate drive means for each of said drums, a brake on each drum, an operating lever connected to each brake, a link pivotally connecting said operating levers, and means to impart a braking force to said link medially of said levers.

22. A drawworks assembly comprising a pair of drums of different diameter, mounted for independent rotation on a common axis, a brake on each drum, including a brake-actuating linkage, means to apply a single braking force to the assembly, and a rocker arm medially, pivotally connected to said means, and pivotally connected, at spaced points, to the respective said linkages, whereby to distribute said force.

23. A drawbacks assembly comprising a pair of drums of different diameter, mounted for independent rotation, a brake on each drum, including a brake-actuating linkage, means to apply a single braking force to the assembly, and a rocker arm medially, pivotally connected to said means, and pivotally connected, at spaced points, to the respective said linkages, whereby to distribute said force.

24. A drawworks assembly comprising a pair of drums of different diameter, mounted for independent rotation, a brake on each drum, including a brake-actuating linkage, means to apply a single braking force to the assembly, a rocker arm medially, pivotally connected to said means, and pivotally connected, at spaced points, to the respective said linkages, whereby to distribute said force, and an auxiliary means for applying braking effort through each of said brake-actuating linkages, independently on said single braking force.

References Cited by the Examiner

UNITED STATES PATENTS

| | | | |
|---|---|---|---|
| 247,680 | 9/1881 | O'Hanlon | 254—185 |
| 1,525,666 | 2/1925 | Smith | 188—204 |
| 1,746,060 | 2/1930 | Symonds | 254—185 |
| 2,084,449 | 6/1937 | Neese | 254—185 |
| 2,191,769 | 2/1940 | Morehouse | 188—204 |
| 2,272,049 | 2/1942 | Hagenbook | 254—185 |
| 2,337,772 | 12/1943 | Robinson | 254—185 |

EVON C. BLUNK, *Primary Examiner.*

SAMUEL F. COLEMAN, HUGO O. SCHULZ,
*Examiners.*

H. HORNSBY, *Assistant Examiner.*